(12) United States Patent
Kito et al.

(10) Patent No.: US 8,198,593 B2
(45) Date of Patent: Jun. 12, 2012

(54) RADIATION CONVERSION DEVICE AND RADIATION IMAGE CAPTURING SYSTEM

(75) Inventors: Eiichi Kito, Minami-ashigara (JP); Yasunori Ohta, Yokohama (JP); Naoyuki Nishino, Minami-ashigara (JP); Hiroshi Tamaoki, Odawara (JP); Tatsuo Iiyama, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 216 days.

(21) Appl. No.: 12/379,469

(22) Filed: Feb. 23, 2009

(65) Prior Publication Data
US 2009/0212222 A1    Aug. 27, 2009

(30) Foreign Application Priority Data

Feb. 25, 2008    (JP) ................................ 2008-043057

(51) Int. Cl.
*G01T 1/20* (2006.01)
(52) U.S. Cl. ................................. 250/363.02
(58) Field of Classification Search ............. 250/363.02
See application file for complete search history.

(56) References Cited

U.S. PATENT DOCUMENTS

| | | | | |
|---|---|---|---|---|
| 5,747,189 | A * | 5/1998 | Perkins | ............................ 429/91 |
| 5,877,501 | A * | 3/1999 | Ivan et al. | ................. 250/370.09 |
| 2002/0150214 | A1 | 10/2002 | Spahn | |
| 2006/0215807 | A1 * | 9/2006 | Ohara | ............................ 378/11 |

FOREIGN PATENT DOCUMENTS

| | | |
|---|---|---|
| JP | 61-150625 | 7/1986 |
| JP | 3494683 | 6/1995 |
| JP | 2000-105297 | 4/2000 |
| JP | 2001-224579 | 8/2001 |
| JP | 2002-336227 | 11/2002 |
| JP | 2006-043191 | 2/2006 |
| JP | 2007-289408 | 11/2007 |

OTHER PUBLICATIONS

"A Non-Contact Electrical Power Transmission Sheet Envisioned for Embedding in Walls or Floors Appears, Developed at Tokyo University," IEDM Press, Dec. 4, 2006.

Marin Soljacic et al. "Wireless Technology Developed to Transmit Power Lights up a 60W Bulb in Tests" Nikkei Electronics, Dec. 3, 2007, vol. 966, pp. 117-128.

* cited by examiner

*Primary Examiner* — David Porta
*Assistant Examiner* — Casey Bryant
(74) *Attorney, Agent, or Firm* — Jean C. Edwards; Edwards Neils PLLC

(57) ABSTRACT

A radiation conversion device includes a radiation detection device, which detects radiation having passed through a subject, and converts the radiation into radiation image information, and a battery unit for supplying electrical power to at least the radiation detection device. The battery unit is equipped with at least two batteries, and set with a required capacity for capturing at least one radiation image.

17 Claims, 6 Drawing Sheets

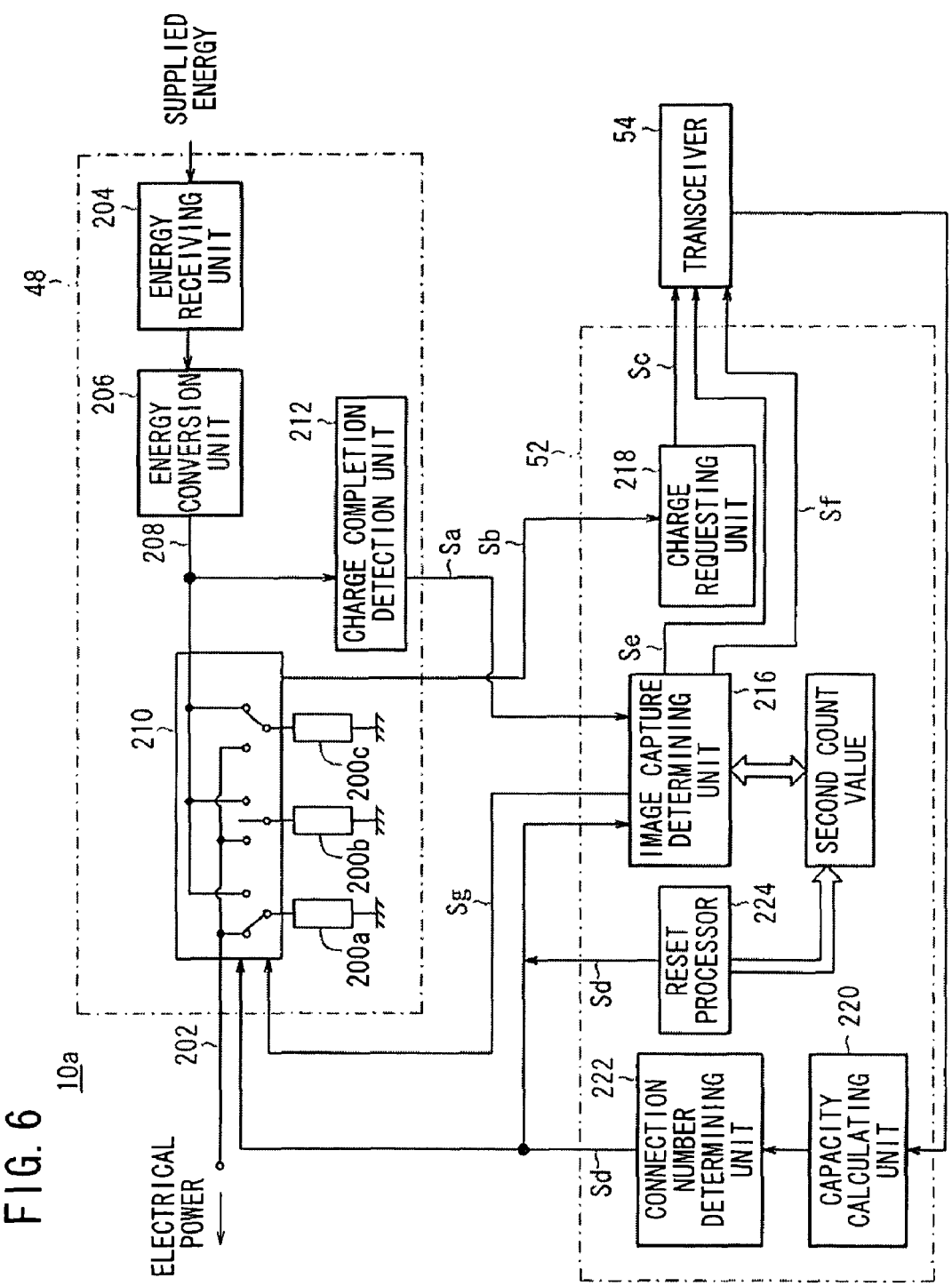

RADIATION CONVERSION DEVICE AND RADIATION IMAGE CAPTURING SYSTEM

CROSS-REFERENCE TO RELATED APPLICATIONS

The present application claims priority from Japanese Patent Application No. 2008-043057, filed Feb. 25, 2008, the contents of which are herein incorporated by reference in their entirety.

BACKGROUND OF THE INVENTION

1. Field of the Invention

The present invention relates to a radiation conversion device for irradiating a subject with radiation and capturing a radiation image, and to a radiation image capturing system that uses such a radiation conversion device.

2. Description of the Related Art

In the medical field, a radiation image capturing apparatus, in which radiation is applied to a subject, and radiation that has passed through the subject is directed to a radiation detection device for capturing a radiation image of the subject, has been widely used.

In this case, as types of radiation detection devices, there are known a radiation film on which a radiation image is exposed and recorded, and a stimulable phosphor panel in which radiation energy is stored as a radiation image in a stimulable phosphor, and when stimulating light is applied thereto, the radiation image can be read out as stimulated light. In such radiation detection devices, the radiation film in which a radiation image has been recorded is supplied to a developing apparatus where an image developing process is carried out, or the stimulable phosphor panel is supplied to a reading apparatus in which the radiation image is acquired as a visible image by performing a reading process thereon.

In a medical environment such as an operating room or the like, for performing rapid and precise treatments with respect to a patient, it is essential to read out and display the radiation image directly from the radiation detection device. As a radiation detection device capable of responding to such requirements, a radiation detection device has been developed that uses solid state detection elements, which convert radiation directly into electrical signals, or which, after the radiation has been converted into visible light by a scintillator, convert the visible light into electrical signals, which are read out.

In particular, in a transportable type of device, a battery for supplying electrical power to the radiation detection device and to various electronic circuits is accommodated inside of a casing in which the radiation detection device is housed. The transportable type of device is generally called cassette.

As a charging system for charging the battery of the electronic cassette, it has been contemplated to carry out charging wirelessly. The methods disclosed in Japanese Laid-Open Patent Publication No. 2007-289408 and Japanese Laid-Open Patent Publication No. 2002-336227 may be considered as types of wireless power transmission methods.

According to the method of Japanese Laid-Open Patent Publication No. 2007-289408, a wave-receiving antenna that receives microwaves and a direct current conversion unit that converts the microwaves into a direct current are disposed in a diagnostic X-ray image capturing apparatus, and a microwave power source apparatus is provided, which converts electric power supplied from a commercial power source into microwaves and transmits electricity from a transmitting antenna. In addition, transmission and reception by microwaves is carried out between the transmitting antenna and the wave-receiving antenna, in order to carry out charging of a battery of the diagnostic X-ray image capturing apparatus.

According to the method disclosed in Japanese Laid-Open Patent Publication No. 2002-336227, a transportable type of radiation receiving device is connected to a control apparatus for the purpose of performing signal transmission through a wireless communication connecting means. The wireless communication connecting means makes up a radio connection means, and in particular, serves as a means for transmitting Bluetooth or DECT signals.

Further, as other methods for wireless transmission of electrical power, the following are known: "A Non-Contact Electrical Power Transmission Sheet Envisioned for Embedding in Walls or Floors Appears, Developed at Tokyo University," IEDM Press, Dec. 4, 2006, (published online at http://techon-.nikkeibp.co.jp/article/NEWS/20061204/124943/) and "Wireless Technology Developed to Transmit Power Lights Up a 60 W Bulb in Tests," Nikkei Electronics, Dec. 3, 2007, vol. 966, pp. 117-128. The method disclosed in the article, "A Non-Contact Electrical Power Sheet Envisioned for Embedding in Walls or Floors Appears, Developed at Tokyo University," concerns a method for transmission of electrical power by electromagnetic inductance from a primary coil, which is embedded in a non-contact power transmitting sheet, whereas the method disclosed in the article, "Wireless Technology Developed to Transmit Power Lights Up a 60 W Bulb in Tests," concerns a technique for wireless transmission of electrical power using magnetic field resonance between two LC resonators.

However, with either of the methods disclosed in Japanese Laid-Open Patent Publication No. 2007-289408 or Japanese Laid-Open Patent Publication No. 2002-336227, setting of an on-board battery, to a capacity for enabling capturing of an image and data transmission to be carried out at least one time, is not contemplated.

Further, the method disclosed in Japanese Laid-Open Patent Publication No. 2007-289408 represents a technique for transmitting electrical power by electromagnetic waves with respect to a battery for normal use, which is loaded into a diagnostic X-ray image capturing apparatus. However, it is necessary either for the wave-receiving antenna and the transmitting antenna to be arranged in close proximity, or for the transmission energy to be large in magnitude, such that there is a limit on making the apparatus small in scale and lightweight.

The method disclosed in Japanese Laid-Open Patent Publication No. 2002-336227 is a technique for transmission of electrical power by cables with respect to a battery for normal use. There is similarly a limit on making the apparatus small in scale and lightweight, and moreover, there is a problem in that time is consumed for charging the battery.

SUMMARY OF THE INVENTION

The present invention, taking into consideration the above-mentioned problems, has the object of providing a radiation conversion device and a radiation image capturing system, in which the batteries loaded into an electronic cassette can be constituted by a minimum of two low capacity batteries, thereby enabling the electronic cassette to be made small in scale and lightweight.

According to a first aspect of the present invention, a radiation conversion device includes a radiation detection device, which detects radiation having passed through a subject and converts the radiation into radiation image information, and a battery unit for supplying electrical power to at least the radiation detection device, wherein the battery unit is equipped with at least two batteries, and the battery unit is set with a necessary capacity for capturing at least one radiation image.

According to a second aspect of the present invention, a radiation image capturing system includes a radiation conversion device comprising a radiation detection device, which detects radiation having passed through a subject, and converts the radiation into radiation image information, and a battery unit for supplying electrical power to at least the radiation detection device, wherein the battery unit of the radiation detection device is equipped with at least two batteries, and the battery unit is set with a required capacity for capturing at least one radiation image, the radiation image capturing system further comprising: a battery selection unit for selecting a battery to be used from among the at least two batteries, based on a number of times that capturing of the radiation image is carried out, and a charging unit for performing charging of a battery that has been used.

As described above, in accordance with the radiation conversion device and the radiation image capturing system of the present invention, the batteries, which are loaded into the electronic cassette, can be constituted by a minimum of two low capacity batteries, thereby enabling the electronic cassette to be made small in scale and lightweight.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 6 is a schematic block diagram showing principal components of a battery unit and a cassette controller of an electronic cassette, in a radiation image capturing system according to a modified example.

DESCRIPTION OF THE PREFERRED EMBODIMENTS

Below, a description shall be provided with reference to FIGS. 1 through 6 of embodiments of the radiation conversion device and the radiation image capturing system according to the present invention.

Figure 1:
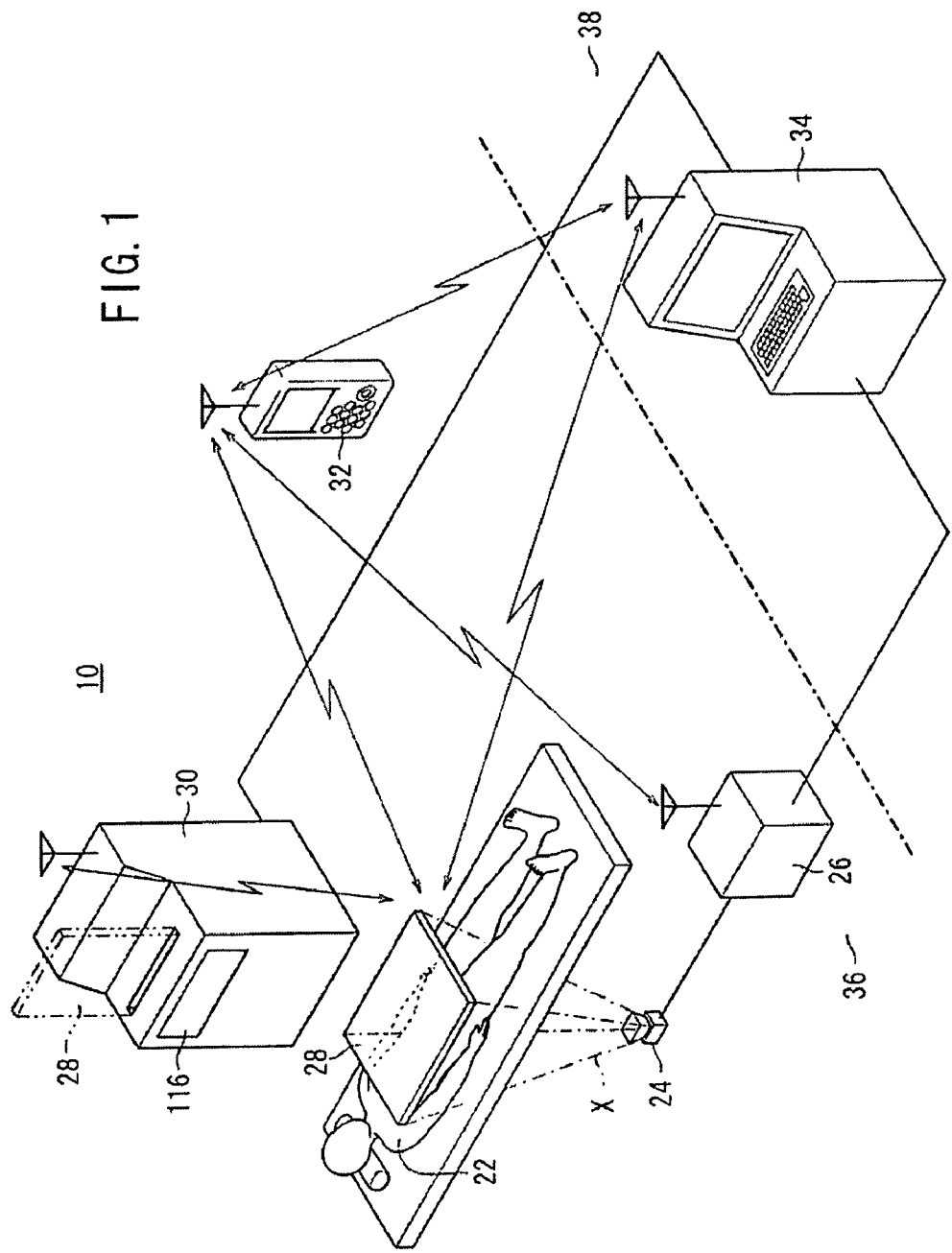
FIG. 1 is a schematic view showing a radiation image capturing system.

As shown in FIG. 1, a radiation image capturing system 10 according to the first embodiment includes a radiation source 24 for irradiating a patient 22 (subject) with radiation X having a given dose according to image capturing conditions, a radiation source control device 26 for controlling the radiation source 24, a radiation conversion device (hereinafter referred to as an electronic cassette 28) having a radiation detection device therein for detecting radiation X that has passed through the patient 22, a cradle 30 for carrying out a charging process with respect to the electronic cassette 28, a portable information terminal 32 having an image capture switch for the radiation source 24, and which is carried by a technician for confirming conditions including image capturing operations, and a console 34 (control apparatus), by which the radiation source control device 26, the electronic cassette 28, the cradle 30 and the portable information terminal 32 are controlled, while also transmitting and receiving necessary information therebetween.

The radiation source 24, the radiation source control device 26, and the cradle 30 are arranged inside of an image capturing room 36 where the image is to be captured, whereas the console 34 is disposed in an operations room 38 outside of the image capturing room 36. Further, transmission and reception of necessary information are carried out between the radiation source control device 26, the electronic cassette 28, the cradle 30, the portable information terminal 32 and the console 34, by means of wireless communications.

Figure 2:
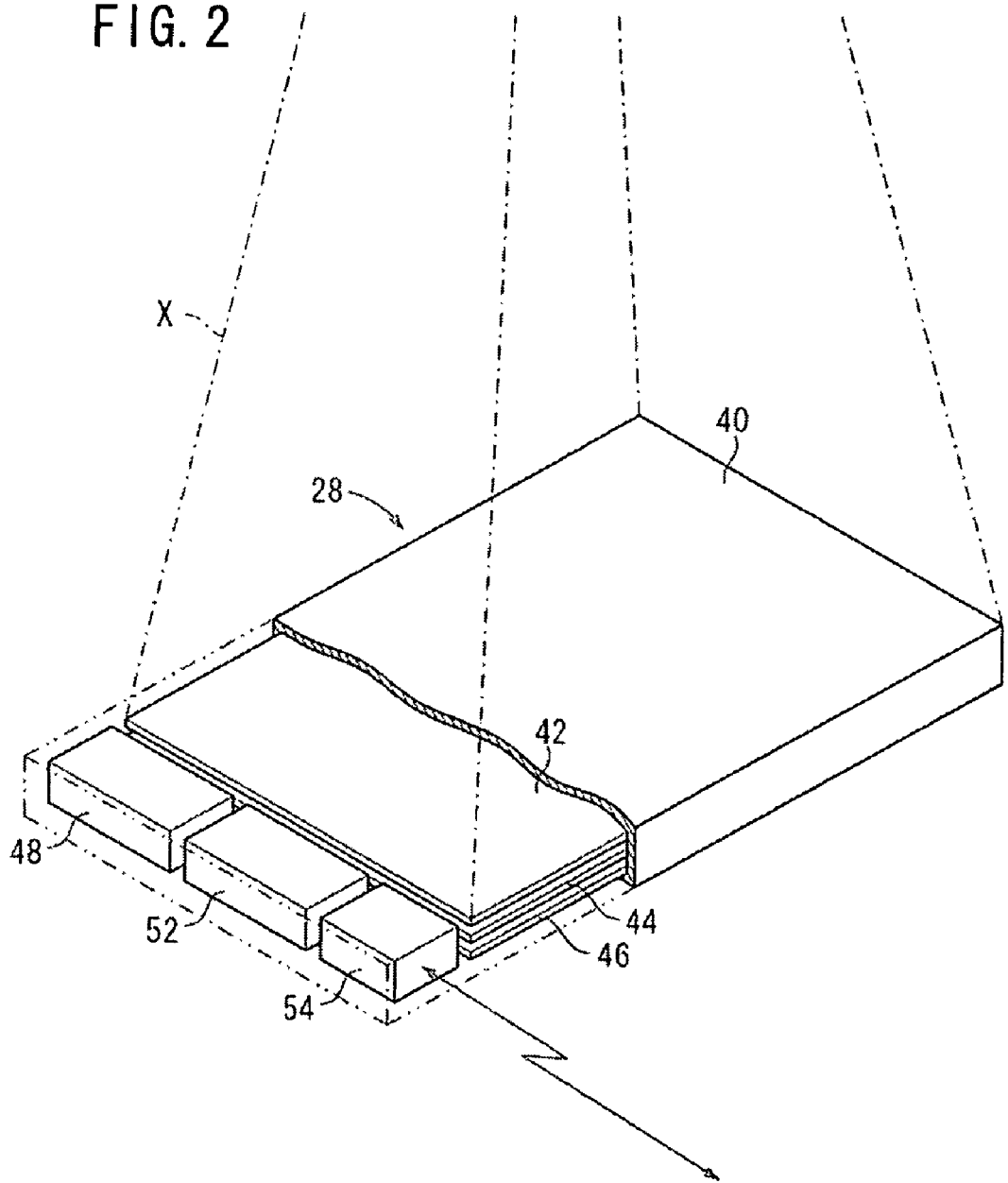
FIG. 2 is an interior structural view of an electronic cassette.

As shown in FIG. 2, the electronic cassette 28 is equipped with a casing 40 made from a material, which is permeable to radiation X. Inside of the casing 40, a grid 42 for removing radiation X scattered from the patient 22, a radiation detection device 44 for detecting radiation X that has passed through the patient 22, and a lead plate 46 for absorbing backscattered radiation X are arranged in this order from the side on which radiation X is irradiated.

Further, as shown in FIG. 2, a battery unit 48 which serves as a power source for the electronic cassette 28, a cassette controller 52 that controls driving of the radiation detection device 44, and a transceiver 54 that transmits and receives signals, including image information of radiation X that is detected by the radiation detection device 44, between the cradle 30, the portable information terminal 32 and a console 34, are accommodated in the casing 40. Moreover, in the cassette controller 52 and the transceiver 54, for avoiding damage caused by irradiation of radiation X, it is preferable for a lead plate or the like to be disposed on a surface side of the casing 40 that is subject to being irradiated with radiation X.

Figure 5:
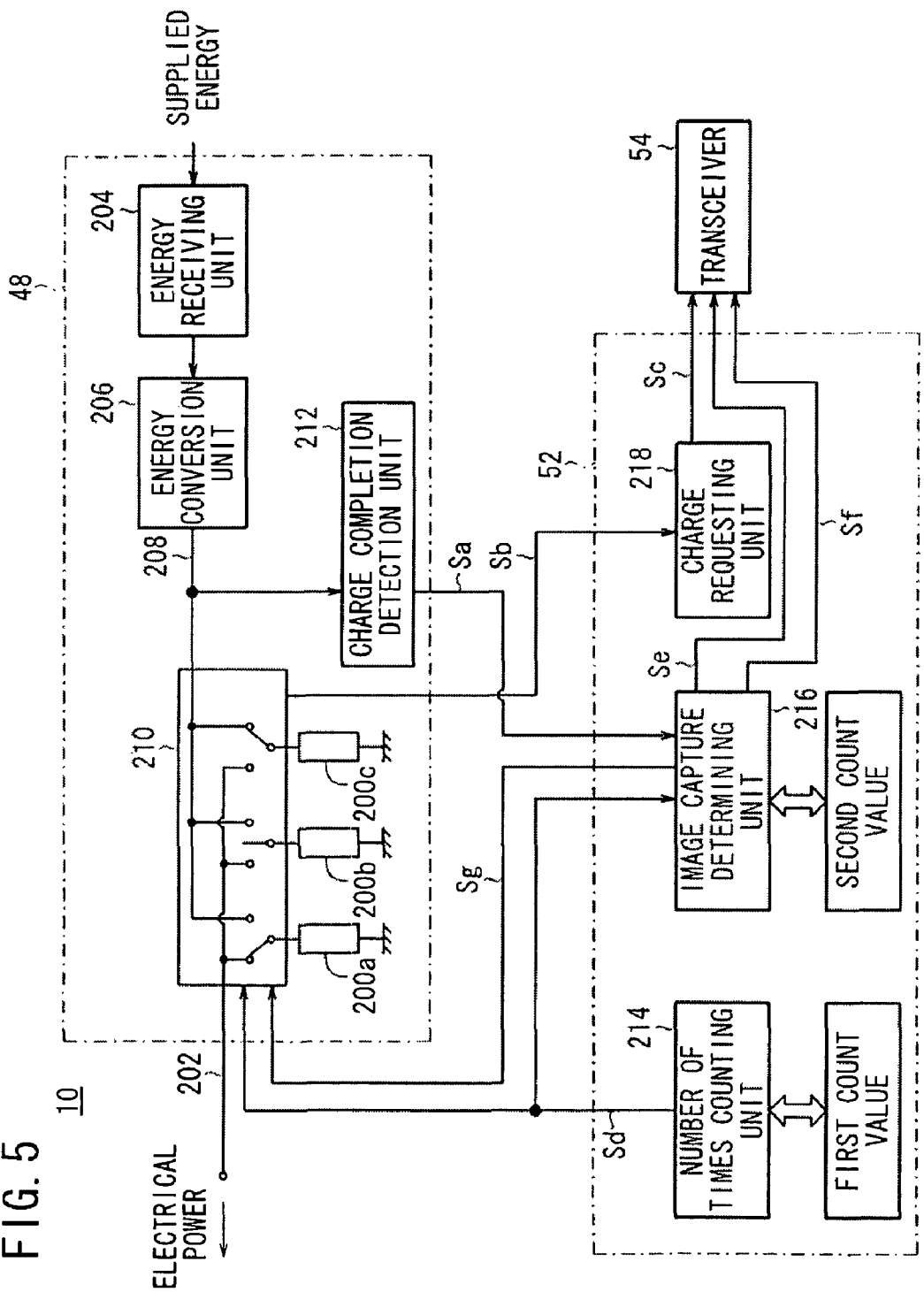
FIG. 5 is a schematic block diagram showing principal components of a battery unit and a cassette controller of the electronic cassette.

The battery unit 48 includes two or more batteries therein, and is set with a necessary capacity for capturing at least one radiation image. In FIG. 5, an example is shown having three batteries (first through third batteries 200a to 200c). Concerning the first through third batteries 200a to 200c, any one of them is set with a capacity that is capable of capturing a minimum of one radiation image, and of transmitting the radiation image information obtained upon capturing of the radiation image.

Further, as shown in FIG. 5, the battery unit 48 includes a power feed line 202 for supplying electrical power with respect to at least the radiation detection device 44, an energy receiving unit 204 for receiving supplied energy from the exterior, an energy conversion unit 206 for converting the supplied energy that was received into electrical energy, a charging line 208 connected to the energy conversion unit 206, a battery switching unit 210 for selectively connecting the first through third batteries 200a to 200c to the power feed line 202 and to the charging line 208, and a charge completion detection unit 212 for detecting that charging of the battery has been completed.

The battery switching unit 210, in an initial state, for example, connects only the first battery 200a (on which charging has been completed) to the power feed line 202, places the second battery 200b (on which charging has been completed) in a floating state, and leaves the third battery 200c (on which charging has been completed) in a connected state to the charging line 208.

The energy receiving unit 204 and the energy conversion unit 206 differ in structure, depending on the type of energy (supplied energy) that is transmitted thereto. For example, if electrical energy is delivered through a cable or a connecting terminal, the energy receiving unit 204, for example, is a connector connected to the cable or to the connecting terminal, and the energy conversion unit 206, for example, is a voltage converter or the like, which converts the supplied voltage into a voltage suitable for carrying out charging of the battery.

If electromagnetic inductance from a primary coil, which is embedded in a non-contact power transmitting sheet is used, as described in the above-mentioned article, "A Non-Contact Electrical Power Transmission Sheet Envisioned for Embedding in Walls or Floors Appears, Developed at Tokyo University," IEDM Press, the energy receiving unit 204 is a secondary coil, and the energy conversion unit 206, for example, is a voltage converter or the like, which converts the voltage generated by the secondary coil into a voltage suitable for carrying out charging of the battery.

Further, if a technique for wireless transmission of electrical power using magnetic field resonance is used, as described in the above-mentioned article, "Wireless Technology Developed to Transmit Power Lights Up a 60 W Bulb in Tests," Nikkei Electronics, Dec. 3, 2007, vol. 966, pp. 117-128, then the energy receiving unit 204 is a second LC resonator arranged corresponding to the first LC resonator on the power transmission side, whereas the energy conversion unit 206, for example, is a coil (i.e., a secondary coil, in the case that a coil of the second LC resonator serves as a primary coil), which converts electromagnetic energy generated by the second LC resonator into electrical energy by electromagnetic induction.

Of course, as the supplied energy, light energy or heat energy may also be utilized. In the case of light energy, the energy receiving unit is a light receiving device for receiving light energy, and the energy conversion unit corresponds to a light conversion device or the like, which converts the received light energy into electrical power. In the case of heat energy, the energy receiving unit is a heat receiving device for receiving heat energy, and the energy conversion unit corresponds to a thermoelectric conversion element (e.g., a thermoelectric transducer that uses the Seebeck effect), which converts the received heat into electrical power.

The charge completion detection unit 212 detects that electrical energy from the energy conversion unit 206 is charging the battery, and outputs a charge completion signal Sa when charging of the battery is completed. The charge completion signal Sa is supplied to an image capture determining unit 216, which shall be discussed later.

Figure 3:
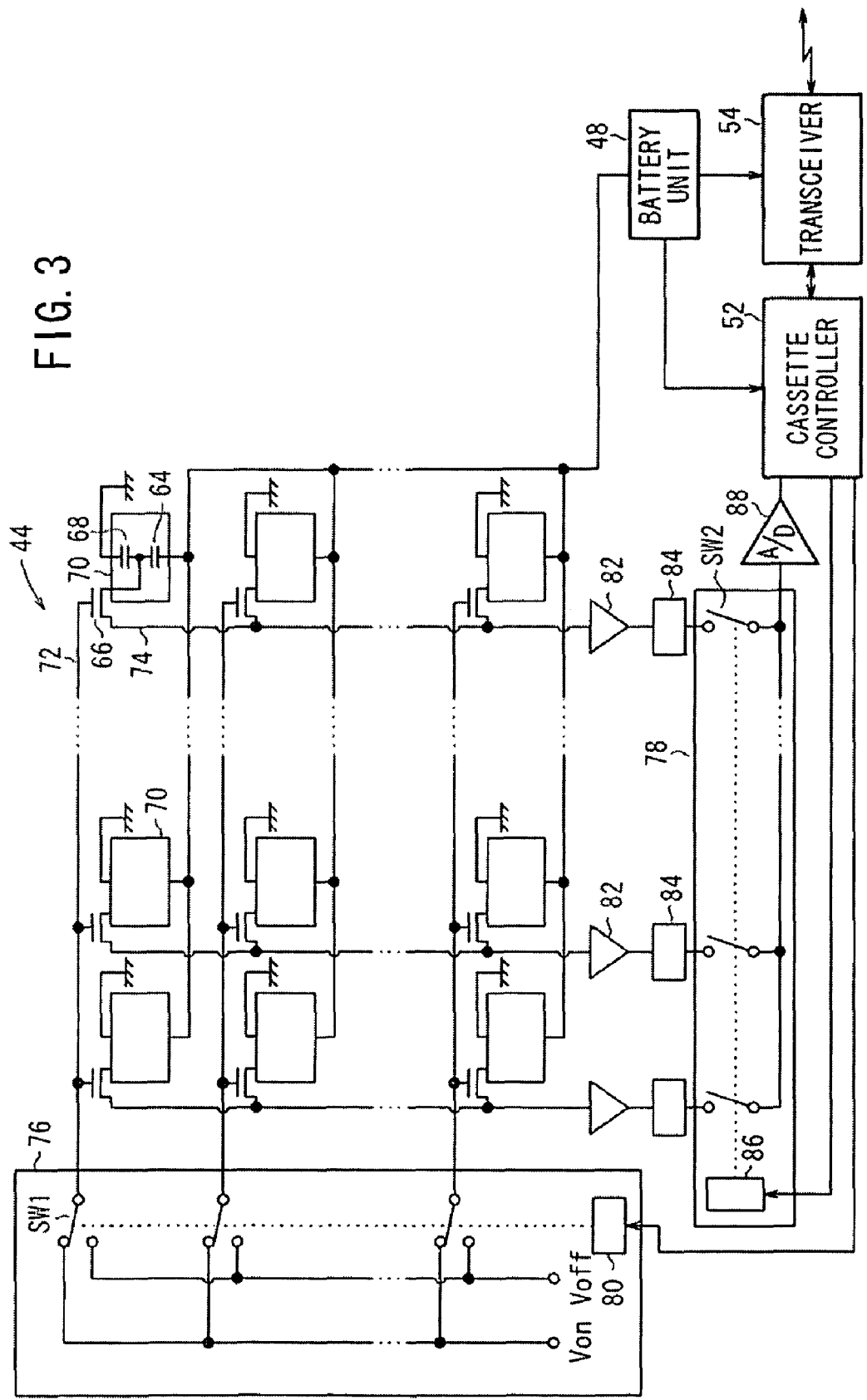
FIG. 3 is a schematic block diagram of the circuit structure of a radiation detection device accommodated inside the electronic cassette.

As shown in FIG. 3, the radiation detection device 44 includes a structure in which a photoelectric conversion layer 64 made up from an amorphous selenium (a-Se) material, which generates electric charges upon sensing radiation X, is disposed on thin film transistors (TFTs) 66 arrayed in a matrix form. After the generated electric charges are accumulated in storage capacitors 68, the TFTs 66 are successively turned on one line at a time, and the electric charges are read out as image signals. FIG. 3 shows the connected relationship of only one of the TFTs 66 and one pixel 70 made up from a photoelectric conversion layer 64 and a storage capacitor 68, whereas the structures of other similar pixels 70 have been omitted from illustration for the sake of simplicity. Since when heated to high temperatures, the structure of amorphous selenium changes and the functionality thereof is lowered, amorphous selenium must be used within a prescribed temperature range. Accordingly, it is preferable to provide some means for cooling the radiation detection device 44 inside the electronic cassette 28.

Gate lines 72, which extend in parallel to the direction of the rows, and signal lines 74 which extend in parallel to the direction of the columns, are connected to the TFTs 66, which are connected respectively to each of the pixels 70. Each of the gate lines 72 is connected to a line scanning driver 76, and each of the signal lines 74 is connected to a multiplexer 78 that constitutes a reading circuit.

Control signals $V_{ON}$, $V_{OFF}$ that control ON and OFF states of the TFTs 66 arrayed in the direction of the rows, are supplied from the line scanning driver 76 to the gate lines 72. In this case, the line scanning driver 76 comprises a plurality of switches SW1 that switch the gate lines 72 on or off, and a first address decoder 80, which outputs selection signals for selecting one of the switches SW1. Address signals are supplied from the cassette controller 52 to the first address decoder 80.

Further, the signal lines 74 are supplied with electric charges, which are stored in the storage capacitors 68 of each of the pixels 70, through the TFTs 66 arranged in the columns. The electric charges supplied to the signal lines 74 are amplified by amplifiers 82. The amplifiers 82 are connected through respective sample and hold circuits 84 to the multiplexer 78. The multiplexer 78 comprises a plurality of switches SW2 for successively switching between the signal lines 74, and a second address decoder 86 for outputting a selection signal for selecting one of the switches SW2 at a time. The second address decoder 86 is supplied with an address signal from the cassette controller 52. An A/D converter 88 is connected to the multiplexer 78. A radiation image signal is converted by the A/D converter 88 into a digital image signal representing the radiation image information, which is supplied to the cassette controller 52.

Further, inside the casing 40 of the electronic cassette 28, an image memory 89 (see FIG. 4) is arranged, which stores the radiation image information detected by the radiation detection device 44. The radiation image information is transmitted through the transceiver 54 to the cradle 30, the portable information terminal 32 and the console 34. The radiation image information may be transmitted, if necessary, in a condition of being subjected to data compression.

Figure 4:
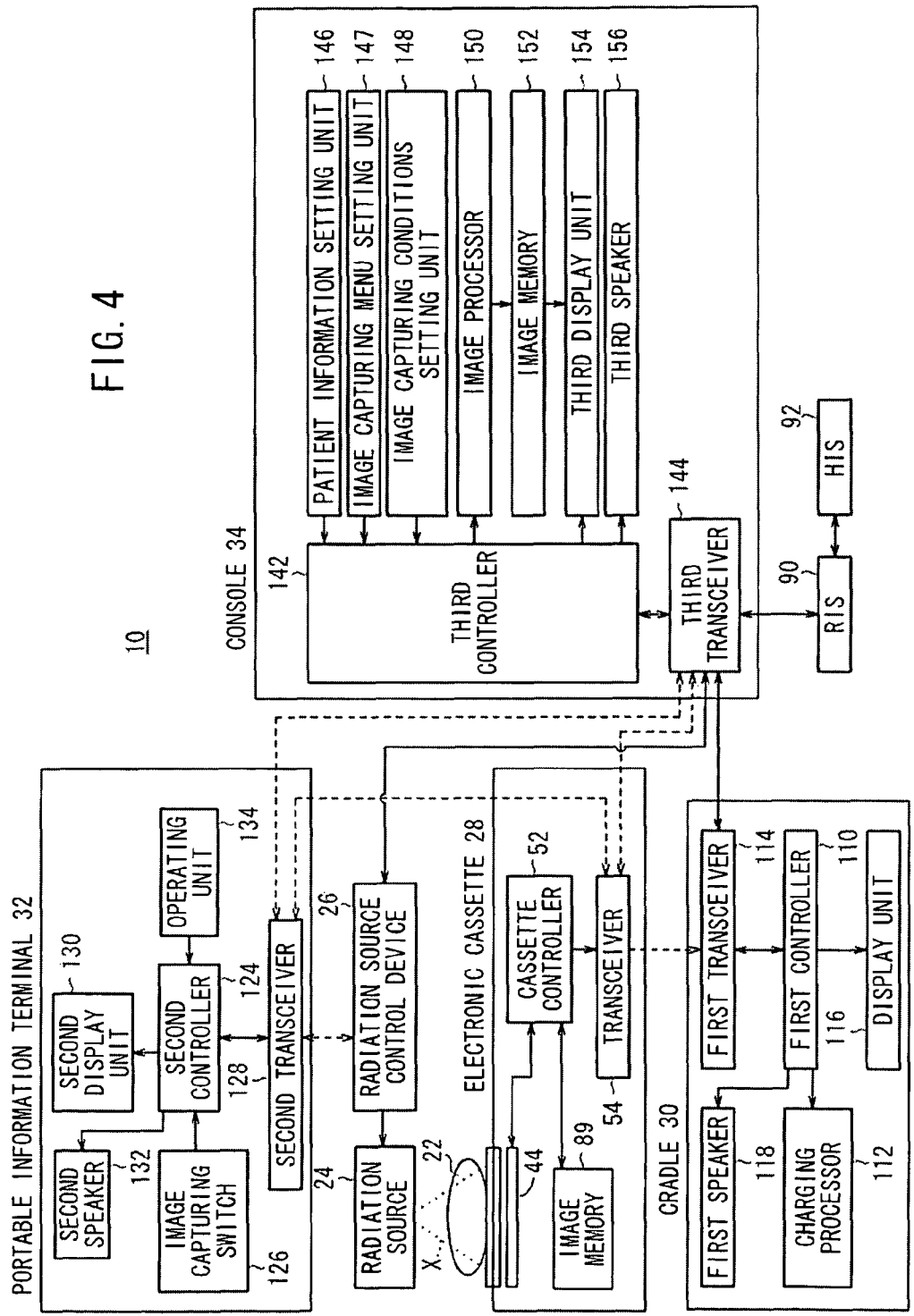
FIG. 4 is a schematic block diagram of the radiation image capturing system.

FIG. 4 is a schematic block diagram of a radiation image capturing system 10. The console 34 is connected to a radiology information system (RIS) 90, which generally manages radiation image information handled by the radiological department of a hospital along with other information. The RIS 90 is connected to a hospital information system (HIS) 92, which generally manages medical information in the hospital.

As shown in FIG. 5, the cassette controller 52 of the electronic cassette 28 comprises a number of times counting unit 214 for counting the number of times that images have been captured, an image capture determining unit 216 for counting the number of uncharged batteries and determining authorization/prohibition of image capturing, and a charge requesting unit 218 for outputting a charge request signal Sc based on a switching completion signal Sb from the battery switching unit 210.

The number of times counting unit 214 increments a first count value by +1 based on a storage process being performed, in which one sheet of radiation image information is stored in the image memory 89 (see FIG. 4) by the cassette controller 52. Additionally, assuming that the capacity of the first through third batteries 200a to 200c of the battery unit 48 is set to a capacity which is capable of carrying out radiation image capturing n times, and of transmitting n pieces of radiation image information obtained from the n times that radiation images are captured, at a stage when the first count value has become n, a switching control signal Sd is output to the image capture determining unit 216 and the battery switching unit 210, and the first count value is reset and initialized to zero. With the present embodiment because n is set to one (n=1), at every time that radiation image capturing is carried out, the switching control signal Sd is output with respect to the image capture determining unit 216 and the battery switching unit 210. The number of times value n is registered and stored beforehand, for example, in a non-illustrated register corresponding to the capacity of the batteries, and the number of times counting unit 214 compares the first count value with the count value (registered count value) stored in the register. At a stage when the first count value equals the registered count value, the switching control signal Sd is output with respect to the battery switching unit 210.

The battery switching unit 210, based on input thereto of the switching control signal Sd from the number of times counting unit 214, for example, disconnects the first battery 200a (use of which is completed) from the power feed line 202, and connects the first battery 200a to the charging line 208, and next, the second battery 200b (charging of which is completed) is connected to the power feed line 202. At this time, the third battery 200c may be placed in a floating state. Additionally, the battery switching unit 210, at a point in time when switching of the batteries is completed, outputs a switching completion signal Sb to the charge requesting unit 218.

The charge requesting unit 218 outputs a charge request signal Sc based on input thereto of a switching completion signal Sb from the battery switching unit 210.

Further, the image capture determining unit 216 increments the second count value that indicates the number of uncharged batteries by +1 each time that the switching control signal Sd is input from the number of times counting unit 214, and decrements the second count value by −1 each time that the charge completion signal Sa is input from the charge completion detection unit 212 of the battery unit 48. In addition, if the second count value is lower than the number of batteries (maximum number of batteries) that are loaded in the electronic cassette 28, an image capturing authorization signal Se is output, whereas in the case that the second count value is the same as the number of batteries, an image capturing prohibition signal Sf is output. If the second count value is smaller than the number of batteries, this means that charged batteries are present, whereas if the second count value is the same as the number of batteries, this signifies that charged batteries are not present, and thus that power cannot be supplied to the radiation detection device 44, etc.

Furthermore, after outputting of the image capturing prohibition signal Sf, the image capture determining unit 216 decrements the second count value by −1, and outputs a second switching control signal Sg to the battery switching unit 210, based on input of the charge completion signal Sa from the charge completion detection unit 212. Based on input thereto of the second switching control signal Sg from the image capture determining unit 216, the battery switching unit 210 connects a battery on which charging is completed to the power feed line 202, while connecting the uncharged battery to the charging line 208. In addition, as noted previously, at a stage when switching has been completed, the charge request signal Sc is output from the charge requesting unit 218, and since the second count value is smaller than the number of batteries, the image capturing authorization signal Se is output from the image capture determining unit 216.

The charge request signal Sc from the charge requesting unit 218, and the image capturing authorization signal Se or the image capturing prohibition signal Sf from the image capture determining unit 216, are supplied to the transceiver 54. The transceiver 54 transmits the charge request signal Sc, the image capturing authorization signal Se, and the image capturing prohibition signal Sf, together with ID information of the electronic cassette 28, to the cradle 30, the portable information terminal 32, and the console 34.

Consequently, by the cradle 30, the portable information terminal 32 and the console 34 referring to the charge request signal Sc from among the transmitted data transmitted thereto from the electronic cassette 28, it can be confirmed whether charging of the battery unit 48 of the electronic cassette 28 is needed. Also, by referring to the image capturing authorization signal Se of the transmitted data, it can be confirmed whether the electronic cassette 28 can be used for capturing a radiation image. Further, by referring to the image capturing prohibition signal Sf, it can be confirmed that all of the batteries that are mounted inside the battery unit 48 of the electronic cassette 28 are uncharged, and thus that the electronic cassette 28 cannot be used for capturing a radiation image.

On the other hand, as shown in FIG. 4, a first controller 110 of the cradle 30 controls a charging processor 112 for carrying out a charging process on the battery unit 48 of the electronic cassette 28, whereas information received from the console 34 through a first transceiver 114 is displayed on a first display unit 116, together with causing a first speaker 118 to emit sounds when necessary. Radiation image information acquired from the electronic cassette 28 may also be displayed as a preview image on the first display unit 116.

Based on the ID information from the electronic cassette 28, and input of the charge request signal Sc and the image capturing authorization signal Se, the first controller 110 performs a control to display on the first display unit 116 the ID information, and a message concerning charging, for example, a message such as "charging is needed, although image capturing is still possible" or the like. Further, based on the ID information from the electronic cassette 28, and input of the charge request signal Sc and the image capturing prohibition signal Sf, the first controller 110 performs a control to display on the first display unit 116 the ID information, and a message concerning charging, for example, a message such as "charging required, image capturing is prohibited" or the like, accompanied by an audio output control, to output an audible message concerning prohibition of image capturing via the first speaker 118.

The charging processor 112 differs in structure, depending on the type of energy (supplied energy) supplied to the electronic cassette 28.

For example, if electrical energy is supplied through a cable or a connecting terminal, the charging processor 112 includes a power generating source, and has a cable or a connecting terminal that is connected to the power generating source. In this case, when the electronic cassette 28 is loaded into the cradle 30, or when a cable is connected to the electronic cassette 28, electrical energy from the power generating source is supplied to the electronic cassette 28 through the cable or the connecting terminal, and further is supplied to the energy conversion unit 206 via the energy receiving unit 204 of the battery unit 48 in the electronic cassette 28. Owing thereto, charging is carried out with respect to the battery that is connected to the charging line 208.

If electrical energy is supplied by electromagnetic inductance from a primary coil, which is embedded in a non-contact power transmitting sheet, as described in the above-mentioned article, "A Non-Contact Electrical Power Transmission Sheet Envisioned for Embedding in Walls or Floors Appears, Developed at Tokyo University," IEDM Press, the charging processor 112 includes a power generating source, and a primary coil, which is connected to a power generating source. In this case, when the electronic cassette 28 is mounted on the non-contact power transmitting sheet, the electrical energy from the power generating source is supplied to the energy conversion unit 206 of the battery unit 48 by means of electromagnetic induction between the primary coil (charging processor 112 side) and the secondary coil (electronic cassette 28 and battery unit 48 side). Owing thereto, charging is carried out with respect to the battery that is connected to the charging line 208.

If a technique for wireless transmission of electrical power using magnetic field resonance is used, as described in the above-mentioned article, "Wireless Technology Developed to Transmit Power Lights Up a 60 W Bulb in Tests," Nikkei Electronics, Dec. 3, 2007, vol. 966, pp. 117-128, then the charging processor 112 includes a power generating source, an oscillating circuit connected to the power source, and a first LC resonator to which electrical energy is communicated by electromagnetic inductance from the oscillating circuit. In this case, charging can be carried out with respect to the electronic cassette 28 while the electronic cassette 28 is under use, or even in a state when the electronic cassette 28 is not being used. More specifically, electrical energy from the power generating source is communicated to the first LC resonator through the oscillating circuit, and furthermore, as a result of magnetic resonance between the first LC resonator (charging processor 112 side) and the second resonator (electronic cassette 28 side), the electrical energy is transmitted wirelessly to the second LC resonator, and is supplied to the energy conversion unit 206 by electromagnetic induction. As a result, charging is carried out with respect to the battery that is connected to the charging line 208.

Of course, as the supplied energy generated from the charging processor 112, light energy or heat energy may also be utilized. In the case of light energy, the charging processor 112 includes a power generating source, and a light emitting element that serves to convert the electrical energy generated by the power generating source into light and output the energy as light energy.

In the case that the supplied energy is heat energy, the charging processor 112 includes a power generating source, and a heat generating element that serves to convert the electrical energy generated by the power generating source into heat and output the energy as heat energy.

Conventionally, the capacity of the battery has been set to a large capacity, so as to be capable of withstanding usage thereof over a long time period. However, the first through third batteries 200a to 200c of the electronic cassette 28 according to the present embodiment do not have a large capacity capable of withstanding long term usage, but rather any of the batteries is set to a comparatively small capacity, capable of capturing a minimum of one radiation image, and of transmitting the radiation image information obtained upon capturing of the radiation image. Owing thereto, the charging time with respect to one of the batteries is finished in a short time. For example, charging is completed in a short time period on the order of a few seconds to a few minutes.

As shown in FIG. 4, the second controller 124 of the portable information terminal 32 supplies an image capturing signal, which is generated by the image capturing switch 126 that drives the radiation source 24, to the radiation source control device 26 through the second transceiver 128. Further, the second controller 124 displays information, received from the console 34 through the second transceiver 128, on the second display unit 130, while also causing the second speaker 132 to emit sounds as necessary. Radiation image information acquired from the electronic cassette 28 may also be displayed as a preview image on the second display unit 130. Moreover, the portable information terminal 32 also includes an operating unit 134, through which various required information can be set.

Based on the ID information from the electronic cassette 28, and input of the charge request signal Sc and the image capturing authorization signal Se, the second controller 124 performs a control to display on the second display unit 130 the ID information, and a message concerning charging, for example, a message such as "charging is needed, although image capturing is still possible" or the like. Further, based on the ID information from the electronic cassette 28, and input of the charge request signal Sc and the image capturing prohibition signal Sf, the second controller 124 performs a control to display on the second display unit 130 the ID information, and a message concerning charging, for example, a message such as "charging required, image capturing is prohibited" or the like, accompanied by an audio output control to output an audible message concerning prohibition of image capturing via the second speaker 132.

As shown in FIG. 4, the console 34 is equipped with a third controller 142, a third transceiver 144 for transmitting and receiving necessary information via wireless communications with respect to the radiation source control device 26, the electronic cassette 28, the cradle 30 and the portable information terminal 32, a patient information setting unit 146 for setting patient information, an image capturing menu setting unit 147 for selecting and setting an image capturing region of the patient 22 from an image capturing menu, an image capturing conditions setting unit 148 for setting required image capturing conditions for an image to be captured by the radiation source control device 26, an image processor 150 for performing image processing on the radiation image information, which is transmitted from the electronic cassette 28, an image memory 152 for storing the processed radiation image information, a third display unit 154 for displaying radiation image information, patient information, the image capturing menu and the like, and a third speaker 156 for emitting a warning notice when necessary.

Based on the ID information from the electronic cassette 28, and input of the charge request signal Sc and the image capturing authorization signal Se, the third controller 142 performs a control to display on the third display unit 154 the ID information, and a message concerning charging, for example, a message such as "charging is needed, although image capturing is still possible" or the like. Further, based on the ID information from the electronic cassette 28, and input of the charge request signal Sc and the image capturing prohibition signal Sf, the third controller 142 performs a control to display on the third display unit 154 the ID information, and a message concerning charging, for example, a message such as "charging required, image capturing is prohibited" or the like, accompanied by an audio output control to output an audible message concerning prohibition of image capturing via the third speaker 156.

The patient information is defined as information for specifying a patient 22, such as the name and sex of the patient 22, a patient ID number, and the like. The image capturing menu serves as a menu for selecting an image capturing region of the patient 22. As an image capturing region, the head region, a chest region, or regions of the four limbs, etc., may be considered. The image capturing conditions are conditions for determining a supplied tube voltage, tube current, irradiation time, etc., for irradiating an image capturing region of the patient 22 with an appropriate dose of radiation X. The patient information and image capturing operating information, including the imaging capturing menu and the image capturing conditions, can be set by the console 34, or can be supplied externally to the console 34 through the RIS 90.

The radiation image capturing system 10 according to the present embodiment is constructed basically as described above. Next, explanations shall be made concerning operations of the radiation image capturing system 10.

When a radiation image is to be captured of the patient 22, using the patient information setting unit 146 of the console 34, patient information concerning the patient 22 is set, together with setting required image capturing conditions using the image capturing conditions setting unit 148. Further, using the image capturing menu setting unit 147, a desired image capturing region, for example, the head region, a chest region, or a region of the four limbs, etc., is set from the image capturing menu disposed on the third display unit 154.

The set patient information, image capturing conditions and image capturing region are transmitted to the portable information terminal 32 held by the technician and displayed on the second display unit 130 thereof. In this case, the technician confirms the patient information, the image capturing conditions and the image capturing region, which are displayed on the second display unit 130 of the portable information terminal 32, so that desired preparations for capturing the image can be carried out.

Next, a technician carries out ordinary operations with respect to the electronic cassette 28. More specifically, first, the technician places the electronic cassette 28 on a desired image capturing region of the patient 22, as selected from the image capturing menu. At this time, a case is assumed in which the first battery 200a (on which charging has been completed) is connected to the power feed line 202 of the battery unit 48, the second battery 200b (on which charging has been completed) is placed in a floating state, and the third battery 200c (on which charging has been completed) is connected to the charging line 208. Accordingly, electrical power from the first battery 200a is supplied to the radiation detection device 44, etc.

Once the electronic cassette 28 has been placed in an appropriate state with respect to the patient 22, the technician operates the image capturing switch 126 of the portable information terminal 32 in order to carry out capturing of the radiation image. When the image capturing switch 126 is operated, the second controller 124 of the portable information terminal 32 transmits an image capturing initiation signal to the radiation source control device 26 via the second transceiver 128. The radiation source control device 26, which has received the image capturing initiation signal, controls the radiation source 24 according to the image capturing conditions supplied beforehand from the console 34, and thereby irradiates the patient 22 with radiation X.

The radiation X that has passed through the patient 22, after scattered rays have been removed by the grid 42 of the electronic cassette 28, irradiates the radiation detection device 44 and is converted into electric signals by the photoelectric conversion layer 64 of each of the pixels 70 making up the radiation detection device 44, which are retained as charges in the storage capacitors 68 (see FIG. 3). Next, the electric charge information that forms the radiation image information of the patient 22 stored in each of the storage capacitors 68 is read out in accordance with address signals, which are supplied from the cassette controller 52 to the line scanning driver 76 and the multiplexer 78.

More specifically, the first address decoder 80 of the line scanning driver 76 outputs a selection signal based on the address signal supplied from the cassette controller 52, thereby selecting one of the switches SW1, and supplies a control signal $V_{ON}$ to the gate of the TFT 66 that is connected to a corresponding gate line 72. On the other hand, the second address decoder 86 of the multiplexer 78 outputs a selection signal according to the address signal supplied from the cassette controller 52, and successively switches the switches SW2, whereby the radiation image information, which is formed as electric charge information stored in the storage capacitors 68 of each of the pixels 70 that are connected to the gate line 72 selected by the line scanning driver 76, is read out in succession through the signal lines 74.

After the radiation image information read from the storage capacitors 68 of the pixels 70 connected to the selected gate line 72 of the radiation detection device 44 has been amplified by the respective amplifiers 82, the radiation image information is sampled by each of the sample and hold circuits 84, and supplied to the A/D converter 88 through the multiplexer 78 and converted into digital signals. The radiation image information having been converted into digital signals is stored in the image memory 89 connected to the cassette controller 52.

Similarly, the first address decoder 80 of the line scanning driver 76 successively turns on the switches SW1 according to the address signals supplied from the cassette controller 52, and reads out the radiation image information, which is made up of charge information stored in the storage capacitors 68 of each of the pixels 70 connected respectively to the gate lines 72, whereupon the radiation image information is stored in the image memory 89 connected to the cassette controller 52 through the multiplexer 78 and the A/D converter 88.

The one sheet portion of radiation image information stored in the image memory 89 is transmitted to the console 34 by wireless communications through the transceiver 54, and after image processing has been implemented thereon by the image processor 150, the radiation image information is stored in the image memory 152 in a state of association with the patient information. Next, the radiation image information stored in the image memory 152 is displayed on the third display unit 154.

On the other hand, after the radiation image information stored in the image memory 89 of the electronic cassette 28 is subjected to data compression processing by the cassette controller 52, the information is transmitted to the cradle 30 and/or the portable information terminal 32, where the image can be displayed as a compressed image on the first display unit 116 or the second display unit 130. The technician can thereby confirm the compressed image displayed on the first display unit 116 or the second display unit 130, and can make a determination as to whether repeating of the image capturing process (i.e., capturing another image) is required or not. Because the amount of information is reduced as a result of data compression, the radiation image information can be displayed quickly.

In the foregoing manner, at a stage when one sheet portion of radiation image information is stored in the image memory 89, since the switching control signal Sd is output with respect to the battery switching unit 210 from the number of times counting unit 214, the battery switching unit 210, for example, disconnects the first battery 200a (use of which is completed) from the power feed line 202, and connects the first battery 200a to the charging line 208, and next, the second battery 200b (charging of which is completed) is connected to the power feed line 202, while the third battery 200c is placed in a floating state. At a point in time when switching of the batteries is completed, a switching completion signal Sb is output from the battery switching unit 210, and based on input of the switching completion signal Sb, the charge requesting unit 218 outputs a charge request signal Sc. On the other hand, the image capture determining unit 216 increments the second count value by +1. Since the second count value is "0" in its initial state, the second count value becomes "1" as a result of being incremented by +1, whereby a display is produced indicating that one uncharged battery is present. In this case, because the second count value is still lower than the number of batteries (maximum value of batteries, which is 3 in this example), an image capturing authorization signal Se is output from the image capture determining unit 216.

The charge request signal Sc and the image capturing authorization signal Se are transmitted together with the electronic cassette ID information to the cradle 30, the portable information terminal 32, and the console 34. As a result, a message concerning charging (e.g., "charging is needed, although image capturing is still possible") is displayed on the first display unit 116 of the cradle 30, the second display unit 130 of the portable information terminal 32, and the third display unit 154 of the console 34.

Assuming that the charging method used for charging the battery unit 48 of the electronic cassette 28 is a wireless transmission method, the charging processor 112 of the cradle 30 automatically initiates a charging process based on receipt of the charge request signal Sc, whereupon the battery connected to the charging line 208 is charged.

If the charging method is performed over cables or by connecting terminals, or alternatively, if the charging method is performed by a non-contact power transmitting sheet, as indicated in the aforementioned article, "A Non-Contact Electrical Power Transmission Sheet Envisioned for Embedding in Walls or Floors Appears, Developed at Tokyo University," IEDM Press, the technician decides to carry out such charging, or perform image capturing of the next image without carrying out charging. When charging is not performed and thereafter image capturing is performed twice in succession+, the number of uncharged batteries becomes three, and this time, the ID information from the electronic cassette 28, the charge request signal Sc, and the image capturing prohibition signal Sf are output. As a result, a message concerning charging (e.g., "charging required, image capturing is prohibited") is displayed on the first display unit 116 of the cradle 30, the second display unit 130 of the portable information terminal 32, and the third display unit 154 of the console 34, accompanied by audio output of an audible message concerning prohibition of image capturing from the first speaker 118 of the cradle 30, the second speaker 132 of the portable information terminal 32, and the third speaker 156 of the console 34.

The technician thus recognizes that use of the electronic cassette 28 is prohibited and that charging must be performed by display of the image capturing prohibition message and the audio output. Accordingly, the technician loads the electronic cassette 28 into the cradle 30, or connects a cable of the cradle to the electronic cassette 28, or places the electronic cassette on the non-contact power transmitting sheet, so that charging of the battery connected to the charging line 208 is carried out. When charging is completed, a charge completion signal Sa is output from the charge completion detection unit 212, and since the second count value is decremented by −1, this time, the ID information of the electronic cassette 28, the charge request signal Sc, and the image capturing authorization signal Se are output, and the message concerning charging is displayed on the first display unit 116 of the cradle 30, the second display unit 130 of the portable information terminal 32, and the third display unit 154 of the console 34. As a result thereof, the technician recognizes that the electronic cassette 28 can be used.

In this manner, in the radiation image capturing system 10, since it is enough for the battery to be set with a capacity that is capable of capturing a radiation image a minimum of one time and of transmitting the radiation image information obtained upon capturing of the radiation image, the electronic cassette 28 can be made small in scale and lightweight, while also enabling the time required for charging the battery unit 48 to be shortened.

In the foregoing example, an example in which three batteries are loaded in the battery unit was shown. However, because a minimum of two batteries may be installed in the battery unit, the electronic cassette can be made further smaller in scale and lightweight.

In particular, even when the electronic cassette 28 is under use, because charging can be carried out automatically with respect to uncharged batteries of the electronic cassette 28 through adoption of a wireless transmission method as the charging method, continuous use of the electronic cassette 28 can be realized. For example, the invention is suitable to so-called long image capturing, in which image capturing of a lengthy subject (i.e., having a significant lengthwise dimension) is carried out over multiple cycles.

In the above-described example, a case was shown in which the battery is set to a capacity that is capable of carrying out radiation image capturing a minimum of one time and of transmitting the radiation image information obtained from capturing the radiation image. However, apart from this example, it is possible for the battery to be set optionally, so as to enable radiation image capturing a minimum of two times, three times, or the like. In this case, the value of the number of times n that radiation images are captured, which is referred to in the number of times counting unit 214, may be adjusted and set accordingly. For example, in the case that a battery is used, which is set to a capacity for enabling radiation images to be captured a minimum of three times, and of transmitting radiation image information obtained from capturing such radiation images, by setting the value of the number of times n that radiation images are captured to "3", the switching control signal Sd is output from the number of times counting unit 214 after each of the three radiation image capturing process has been carried out.

Further, in the above-described example, the charging processor 112 was shown and exemplified as being arranged inside of the cradle 30. However, apart from this arrangement, the charging processor 112 also may be arranged in an image capturing base (i.e., an image capturing apparatus, an upright/recumbent image capturing platform, cassette table, etc.), in the radiation source 24, or in the radiation source control device 26, or the like.

Next, a radiation image capturing system 10a according to a modified example shall be explained with reference to FIG. 6.

The radiation image capturing system 10a according to the modified embodiment has a structure roughly the same as the radiation image capturing system 10 according to the aforementioned embodiment. However, the radiation image capturing system 10a differs in that the first through third batteries 200a to 200c of the electronic cassette 28 are set respectively with a fixed capacity, irrespective of the number of times that images are captured. Further, in place of the number of times counting unit 214, the radiation image capturing system 10a includes a capacity calculating unit 220, a connection number determining unit 222, and a reset processor 224. Moreover, the determination rules performed by the image capture determining unit 216 also are different.

The capacity calculating unit 220 calculates a necessary capacity (hereinafter indicated as "required capacity") required for capturing an image, from image capturing conditions supplied from the console 34 via the transceiver 54.

The connection number determining unit 222 divides the calculated required capacity by the capacity of one of the batteries (fixed capacity value), determines the number of batteries needed, and outputs the switching control signal Sd for the same number of times as the determined battery number.

The battery switching unit 210 connects batteries to the power feed line 202 based on input thereto of the switching control signal Sd. In an initial state, for example, the first through third batteries 200a to 200c are connected to the charging line 208. Accordingly, for example, if the switching control signal Sd is input two times, the first battery 200a and the second battery 200b are connected to the power feed line 202. At this time, the first battery 200a and the second battery 200b are connected in parallel. Of course, if the switching signal Sd is input three times, all of the first through third batteries 200a to 200c are connected in parallel to the power feed line 202.

The image capture determining unit 216 outputs an image capturing authorization signal Se in the event that the second count value is at or below the number (maximum number) of batteries. The image capturing prohibition signal Sf is output only in the case that the second count value is greater than the number (maximum number) of batteries. Owing thereto, even if all of the first through third batteries 200a to 200c are connected to the power feed line 202, the image capturing prohibition signal Sf is not output.

The reset processor 224 is initiated after all of the batteries (in this case, all of the first through third batteries 200a to 200c) have been connected in parallel to the power feed line 202 and image capturing has been performed one time, or in the case that the number of required batteries exceeds the number of charged batteries.

The reset processor 224 outputs the switching control signal Sd three times to connect all of the first through third batteries 200a to 200c to the charging line 208, so that the second count value is made greater than the number of batteries. Consequently, the image capturing prohibition signal Sf is output from the image capture determining unit 216. In addition, upon all of the batteries 200a to 200c, or the uncharged batteries thereof, being charged, the reset processor 224 resets the second count value (to "0"). That is, the initial state is restored. Thereafter, the capacity calculating unit 220 and the connection number determining unit 222 are started up again, and the same processing described above is repeated.

In the modified example, since the capacity of the batteries can be set to a minimum capacity, irrespective of the number of times that images are captured, the electronic cassette 28 can be made small in scale and lightweight, and the time required for charging can be reduced.

Of course, the present invention is not limited to the above-described embodiments, and the invention can be freely modified, within a range that does not deviate from the essence and gist of the present invention.

For example, the radiation detection device 44 accommodated in the electronic cassette 28 converts the radiation dose of the irradiated radiation X directly into electric signals through the photoelectric conversion layer 64. However, in place of this structure, a radiation detection device in which irradiated radiation X is converted initially into visible light by a scintillator, and thereafter, the visible light is converted into electric signals using a solid-state detection element formed from amorphous silicon (a-Si) or the like, may also be used (see, Japanese Patent Document No. 3494683).

Further, the radiation image information can be obtained using a light readout type of radiation detection device. With such a light readout type of radiation detection device, radiation is irradiated onto respective solid state detection elements arranged in a matrix form, and an electrostatic latent image corresponding to the irradiation dose is stored cumulatively in the solid state detection elements. When the electrostatic latent image is read, reading light is irradiated onto the radiation detection device, and the generated current values are acquired as radiation image information. Further, by irradiating the radiation detection device with erasing light, the radiation image information in the form of a residual electrostatic latent image can be erased and the radiation detection device can be reused (see, Japanese Laid-Open Patent Publication No. 2000-105297).

Furthermore, a stimulable phosphor panel can also be used as the radiation detection device.

What is claimed is:

1. A radiation image capturing system having a radiation conversion device comprising a radiation detection device, which detects radiation having passed through a subject upon capturing a radiation image, and converts the radiation into radiation image information, and a battery unit for supplying electrical power to at least the radiation detection device,
    wherein the battery unit of the radiation conversion device is equipped with at least two batteries, and a chargeable capacity of each of the batteries is set with a required capacity that is capable of capturing a minimum of one radiation image, and of transmitting the radiation image information obtained upon capturing of the radiation image.

2. The radiation image capturing system according to claim 1, wherein the battery unit comprises:
    a power feed line for supplying electrical power to the radiation detection device;
    an energy conversion unit for converting supplied energy from the exterior to electrical energy;
    a charging line connected to the energy conversion unit; and
    a battery switching unit for selectively connecting the at least two batteries to the power feed line and to the charging line.

3. The radiation image capturing system according to claim 2, wherein the supplied energy is supplied to the energy conversion unit wirelessly from the exterior.

4. The radiation image capturing system according to claim 1, wherein each of the at least two batteries is separately switched to a power feed line and a charging line.

5. The radiation image capturing system according to claim 4, wherein while one of the at least two batteries supplies power, another of the at least two batteries is charged.

6. A radiation image capturing system having a radiation conversion device comprising a radiation detection device, which detects radiation having passed through a subject upon capturing a radiation image, and converts the radiation into radiation image information, and a battery unit for supplying electrical power to at least the radiation detection device,
    wherein the battery unit of the radiation conversion device is equipped with a plurality of batteries, and a chargeable capacity of at least two of the batteries is set with a required capacity that is capable of capturing a minimum of one radiation image, and of transmitting the radiation image information obtained upon capturing of the radiation image.

7. The radiation image capturing system according to claim 6, wherein the battery unit comprises:
   a power feed line for supplying electrical power to the radiation detection device;
   an energy conversion unit for converting supplied energy from the exterior to electrical energy;
   a charging line connected to the energy conversion unit; and
   a battery switching unit for selectively connecting the at least two batteries to the power feed line and to the charging line.

8. The radiation image capturing system according to claim 7, wherein the supplied energy is supplied to the energy conversion unit wirelessly from the exterior.

9. The radiation image capturing system according to claim 7, further comprising:
   a capacity calculating unit for determining a required capacity for one radiation image capturing corresponding to at least image capturing conditions,
   wherein the battery switching unit selectively connects a number of the at least two batteries corresponding to the required capacity to the power feed line.

10. The radiation image capturing system according to claim 6, wherein each of the at least two batteries is separately switched to a power feed line and a charging line.

11. The radiation image capturing system according to claim 10, wherein while one of the at least two batteries supplies power, another of the at least two batteries is charged.

12. A radiation image capturing system having a radiation conversion device comprising a radiation detection device, which detects radiation having passed through a subject upon capturing a radiation image, and converts the radiation into radiation image information, and a battery unit for supplying electrical power to at least the radiation detection device, wherein the battery unit of the radiation conversion device is equipped with a plurality of batteries capable of being charged, each of the batteries is set with a fixed capacity, and at least two of the batteries are connected so as to meet a required capacity that is capable of capturing a minimum of one radiation image, and of transmitting the radiation image information obtained upon capturing of the radiation image.

13. The radiation image capturing system according to claim 12, wherein the battery unit comprises:
   a power feed line for supplying electrical power to the radiation detection device;
   an energy conversion unit for converting supplied energy from the exterior to electrical energy;
   a charging line connected to the energy conversion unit; and
   a battery switching unit for selectively connecting the at least two batteries to the power feed line and to the charging line.

14. The radiation image capturing system according to claim 13, wherein the supplied energy is supplied to the energy conversion unit wirelessly from the exterior.

15. The radiation image capturing system according to claim 13, further comprising:
   a capacity calculating unit for determining a required capacity for one radiation image capturing corresponding to at least image capturing conditions,
   wherein the battery switching unit selectively connects a number of the at least two batteries corresponding to the required capacity to the power feed line.

16. The radiation image capturing system according to claim 12, wherein each of the at least two batteries is separately switched to a power feed line and a charging line.

17. The radiation image capturing system according to claim 16, wherein while one of the at least two batteries supplies power, another of the at least two batteries is charged.

* * * * *